United States Patent
Caroli et al.

(10) Patent No.: US 11,544,267 B2
(45) Date of Patent: Jan. 3, 2023

(54) HIERARCHICAL WINDOW FUNCTION

(71) Applicant: SAP SE, Walldorf (DE)

(72) Inventors: Manuel Caroli, Walldorf (DE); Aleksei Burlakov, Irkutsk (RU)

(73) Assignee: SAP SE, Walldorf (DE)

( * ) Notice: Subject to any disclaimer, the term of this patent is extended or adjusted under 35 U.S.C. 154(b) by 18 days.

(21) Appl. No.: 16/274,903

(22) Filed: Feb. 13, 2019

(65) Prior Publication Data

US 2019/0317939 A1    Oct. 17, 2019

Related U.S. Application Data

(60) Provisional application No. 62/656,146, filed on Apr. 11, 2018.

(51) Int. Cl.
| | |
|---|---|
| *G06F 16/2455* | (2019.01) |
| *G06F 16/22* | (2019.01) |
| *G06F 16/2457* | (2019.01) |
| *G06F 16/185* | (2019.01) |

(52) U.S. Cl.
CPC ...... *G06F 16/24554* (2019.01); *G06F 16/185* (2019.01); *G06F 16/2264* (2019.01); *G06F 16/2272* (2019.01); *G06F 16/24578* (2019.01)

(58) Field of Classification Search
CPC ........... G06F 16/24554; G06F 16/2272; G06F 16/24578; G06F 16/2264; G06F 16/185; G06F 16/284; G06F 16/282
See application file for complete search history.

(56) References Cited

U.S. PATENT DOCUMENTS

| | | | |
|---|---|---|---|
| 7,412,444 B2 | 8/2008 | Gaponoff | |
| 2004/0006574 A1* | 1/2004 | Witkowski | G06F 16/2264 |
| 2004/0034616 A1* | 2/2004 | Witkowski | G06F 16/283 |
| 2005/0065910 A1* | 3/2005 | Welton | G06F 16/2264 |
| 2016/0125032 A1* | 5/2016 | Lee | G06F 16/24554 |
| | | | 707/741 |
| 2019/0377801 A1* | 12/2019 | McKee | G06F 16/86 |

OTHER PUBLICATIONS

Halmos, Paul R. "*Naive Set Theory*." Springer, 1960.

(Continued)

*Primary Examiner* — Ashish Thomas
*Assistant Examiner* — Yohanes D Kelemework
(74) *Attorney, Agent, or Firm* — Mintz Levin Cohn Ferris Glovsky and Popeo, P.C.

(57) ABSTRACT

A method may include generating, based on a representation of a hierarchy stored in a database, a visiting sequence data structure. The hierarchy may be stored in a table in the database. Each of a plurality of rows comprising the table may correspond to one of a plurality of nodes comprising the hierarchy. The visiting sequence data structure may include a row vector specifying an order for traversing the plurality of nodes in the hierarchy. A hierarchical window function may be executed by iterating through the plurality of rows in the table in accordance with the order specified by the row vector. The execution of the hierarchical window function may further include determining, for a first node in the hierarchy, a summary value corresponding to a first value of the first node and a second value of a second node descendent from the first node.

20 Claims, 13 Drawing Sheets

(56) References Cited

OTHER PUBLICATIONS

Turley, P. et al., "*Beginning T-SQL with Microsoft® SQL Server® 2005 and 2008.*" Wiley Publishing, Inc., 2009.
Boncz, P. et al., "Monetdb/xquery: A fast xquery processor powered by a relational engine." *SIGMOD*, 2006.
Brunel, R. et al., "Index-assisted hierarchical computations in main-memory rdbms." *VLDB*, pp. 1065-1076, 2016.
Brunel, R. et al., "Supporting hierarchical data in SAP HANA." pp. 1280-1291, 2015.
Cohen, E. et al., "Labeling dynamic xml trees." *PODS*, pp. 271-281, 2002.
DB-Engines.com. Db-engines ranking: popularity ranking of database man-agement systems. https://db-engines.com/en/ranking.
Dietz, Paul F. "Maintaining order in a linked list." *Proceedings of the Fourteenth Annual ACM Symposium on Theory of Computing*, pp. 122-127, 1982.
Duong, M. et al., "LSDX: A new labeling scheme for dynamically updating xml data." *ADC*, pp. 185-193, 2005.
Finis, J. et al., "Indexing highly dynamic hierarchical data." *VLDB*, pp. 986-997, 2015.
Free Software Foundation. Bison—gnu parser generator.
Godsil C. D. et al., "A new graph product and its spectrum." *Bull. Austral. Math*, 1978.
Govorcin, Jelena et al., "On the connectivity of cartesian product of graphs." *Ars mathematica contemporanea*, 2013.
Grust, T. et al., "Staircase join: Teach a relational dbms to watch its (axis) steps." *VLDB*, pp. 524-535, 2003.
Li, C. et al., "Qed: A novel quaternary encoding to completely avoid re-labeling in xml updates." *CIKM*, pp. 501-508, 2005.
Li, Q. et al., "Indexing and querying xml data for regular path expressions." *VLDB*, pp. 361-370, 2001.
Lorentz, D. et al., "*Oracle Database SQL Language Reference 11g Release 2* (11.2)" Oracle, 2016.
Microsoft TechNet. Recursive queries using common table expressions.
NIST. perfect binary tree. https://xlinux.nist.gov/dads/HTML/perfectBinaryTree.html.
O'Neil, P.E. et al., "Ord-paths: Insert-friendly xml node labels." *SIGMOD*, pp. 903-908, 2004.
SAP SE. Sap vora developer guide. https://help.sap.com/viewer/product/SAP_VORA/2.1/en-US.
Tatarinov, I. et al., "Storing and querying ordered xml using a relational database system." *SIGMOD*, pp. 204-215, 2002.
Wu, X. et al., "A prime number labeling scheme for dynamic ordered xml trees." *ICDE*, pp. 66-78, 2004.
Zemke, F. et al., "Introduction to olap functions." *ANSI Document NCITS H2-99-154r2*, pp. 66-78, 1999.
Zhang, C. et al., "On supporting containment queries in relational database management systems." *SIGMOD*, pp. 425-436, 2001.
Communication under Rule 71(3) EPC, issued in European Application No. 19 168 129.5-1203, dated Nov. 14, 2022 (dated Nov. 14, 2022), 74 pages.

* cited by examiner

| Key | Parent | PSL | NI | GapNI | Ordpath |
|-----|--------|-----|-----|-------|---------|
| A | null | 0;8;0 | [0,17] | [0,1700] | 1 |
| B | A | 1;0;1 | [1,2] | [100,200] | 1.1 |
| C | A | 2;4;1 | [3,12] | [300,1200] | 1.3 |
| D | C | 3;0;2 | [4,5] | [400,500] | 1.3.1 |
| E | C | 4;0;2 | [6,7] | [600,700] | 1.3.3 |
| F | C | 5;0;2 | [8,9] | [800,900] | 1.3.5 |
| G | C | 6;0;2 | [10,11] | [1000,1100] | 1.3.7 |
| H | A | 7;0;1 | [13,14] | [1300,1400] | 1.5 |
| I | A | 8;0;1 | [15,16] | [1500,1600] | 1.7 |

FIG. 1B

Hierarchy 340a

| Label1 | Value1 | Node1 |
|---|---|---|
| X | 1 | • |
| Y | 2 | • |
| Z | 3 | • |

Hierarchy 340b

| Label2 | Value2 | Node2 |
|---|---|---|
| A | 5 | • |
| B | 7 | • |
| C | 11 | • |
| D | 13 | • |

Result 340c

| Label1 | Value1 | Label2 | Value2 |
|---|---|---|---|
| X | 1 | A | 5 |
| X | 1 | B | 7 |
| X | 1 | C | 11 |
| X | 1 | D | 13 |
| Y | 2 | A | 5 |
| Y | 2 | B | 7 |
| Y | 2 | C | 11 |
| Y | 2 | D | 13 |
| Z | 3 | A | 5 |
| Z | 3 | B | 7 |
| Z | 3 | C | 11 |
| Z | 3 | D | 13 |

HIERARCHICAL WINDOW FUNCTION

RELATED APPLICATION

This application claims priority to U.S. Provisional Application No. 62/656,146, filed on Apr. 11, 2018 and entitled "HIERARCHICAL WINDOW FUNCTION," the disclosure of which is incorporated herein by reference in its entirety.

TECHNICAL FIELD

The subject matter described herein relates generally to database processing and more specifically to processing hierarchical data stored in a database.

BACKGROUND

Hierarchical data may refer to data that has been organized into a tree-like structure. For example, hierarchical data may be associated with level-based hierarchies having fixed depths and/or parent-child hierarchies having variable depths. Although hierarchical data have numerous applications, the functionalities of a conventional database management system may not be optimized for processing hierarchical data. For instance, a structured query language (SQL) SELECT query, which is commonly used to retrieve rows of data from one or more tables in a relational database, may not be suitable for operating on a parent-child hierarchy stored in a self-referencing table because the number of times the self-referencing table must be joined to execute the SQL SELECT query may be indeterminate. Meanwhile, the functionalities that are available for operating on the parent-child hierarchy (e.g., recursive common table expressions, stored procedures, SQL GROUP BY ROLLUP queries, and/or the like) tend to be inflexible and/or slow.

SUMMARY

Systems, methods, and articles of manufacture, including computer program products, are provided for operating on hierarchical data in a database. In some example embodiments, there is provided a system that includes at least one processor and at least one memory. The at least one memory may include program code that provides operations when executed by the at least one processor. The operations may include: generating, based at least on a representation of a first hierarchy stored in a database, a visiting sequence data structure, the first hierarchy being stored in a table in the database, each of a plurality of rows comprising the table corresponding to one of a plurality of nodes comprising the first hierarchy, and the visiting sequence data structure include a first row vector specifying an order for traversing the plurality of nodes in the first hierarchy; and executing a hierarchical window function by at least iterating through the plurality of rows comprising the table in accordance with the order specified by the first row vector and determining, for a first node in the first hierarchy, a summary value corresponding to a first value of the first node and a second value of a second node descendent from the first node.

In some variations, one or more features disclosed herein including the following features can optionally be included in any feasible combination. The summary value may be an average, a count, a maximum, a medium, a minimum, a mode, a range, and/or a sum of the first value of the first node and the second value of the second node.

In some variations, the execution of the hierarchical window function may further include determining, for a third node comprising a parent node of the first node and/or the second node, another summary value corresponding to a third value of the third node and at least one of the first value of the first node and the second value of the second node.

In some variations, the visiting sequence data structure may further includes a second row vector enumerating one or more rows in the table corresponding to parent nodes in the first hierarchy or children nodes in the first hierarchy.

In some variations, the hierarchical window function may be associated with a frame comprising one or more levels of the first hierarchy. The summary value may be determined based on the first value of the first node and the second value of the second node based at least on the first node and the first node occupying the one or more levels of the frame. The summary value may be determined without a third value of a third node occupying a level outside of the frame. The visiting sequence data structure may further include a second row vector enumerating ancestor nodes of the first node occupying the one or more levels of the frame.

In some variations, the executing the hierarchical window function may further include iterating from the first node of the first hierarchy to the second node in the first hierarchy. The second node may be a child node of the first node when the hierarchical window function is executed in a top down order. The second node may be a parent node of the first node when the hierarchical window function is executed in a bottom up order.

In some variations, the first hierarchy may be a rooted product or a join between a second hierarchy and a third hierarchy.

In some variations, the first hierarchy may be a partition from a second hierarchy that is divided into the first hierarchy and a third hierarchy. The executing of the hierarchical window function may further include generating another visiting sequence data structure including a second row vector specifying an order for traversing a plurality nodes comprising the third hierarchy and iterating through the plurality of nodes comprising the third hierarchy in the order specified by the second row vector.

In some variations, executing the hierarchical window function may further include generating a second hierarchy that is a partition from the first hierarchy or a result of a rooted join between the first hierarchy and a third hierarchy.

In some variations, the representation of the first hierarchy may be generated by at least applying an indexing scheme to the first hierarchy. The applying of the indexing scheme may include assigning, to each of the plurality of nodes comprising the first hierarchy, one or more labels to enable an identification of parent nodes, children nodes, and sibling nodes in the first hierarchy. The indexing scheme may include a Pre, Post, Parent, and Level (PPPL) indexing scheme and/or a Pre, Size, and Level (PSL) indexing scheme.

In another aspect, there is provided a method for operating on hierarchical data in a database. The method may include: generating, based at least on a representation of a first hierarchy stored in a database, a visiting sequence data structure, the first hierarchy being stored in a table in the database, each of a plurality of rows comprising the table corresponding to one of a plurality of nodes comprising the first hierarchy, and the visiting sequence data structure include a first row vector specifying an order for traversing the plurality of nodes in the first hierarchy; and executing a hierarchical window function by at least iterating through the plurality of rows comprising the table in accordance with the order specified by the first row vector and determining, for a first node in the first hierarchy, a summary value corresponding to a first value of the first node and a second value of a second node descendent from the first node.

In some variations, one or more features disclosed herein including the following features can optionally be included in any feasible combination. The summary value may be an average, a count, a maximum, a medium, a minimum, a mode, a range, and/or a sum of the first value of the first node and the second value of the second node.

In some variations, the execution of the hierarchical window function may further include determining, for a third node comprising a parent node of the first node and/or the second node, another summary value corresponding to a third value of the third node and at least one of the first value of the first node and the second value of the second node.

In some variations, the visiting sequence data structure may further include a second row vector enumerating one or more rows in the table corresponding to parent nodes in the first hierarchy or children nodes in the first hierarchy.

In some variations, the hierarchical window function may be associated with a frame comprising one or more levels of the first hierarchy. The summary value may be determined based on the first value of the first node and the second value of the second node based at least on the first node and the first node occupying the one or more levels of the frame. The summary value may be determined without a third value of a third node occupying a level outside of the frame.

In some variations, the visiting sequence data structure may further include a second row vector enumerating ancestor nodes of the first node occupying the one or more levels of the frame.

In some variations, the executing the hierarchical window function may further include iterating from the first node of the first hierarchy to the second node in the first hierarchy. The second node may be a child node of the first node when the hierarchical window function is executed in a top down order. The second node may be a parent node of the first node when the hierarchical window function is executed in a bottom up order.

In another aspect, there is provided a computer program product that includes a non-transitory computer readable medium storing instructions. The instructions may cause operations when executed by at least one data processor. The operations may include: generating, based at least on a representation of a first hierarchy stored in a database, a visiting sequence data structure, the first hierarchy being stored in a table in the database, each of a plurality of rows comprising the table corresponding to one of a plurality of nodes comprising the first hierarchy, and the visiting sequence data structure include a first row vector specifying an order for traversing the plurality of nodes in the first hierarchy; and executing a hierarchical window function by at least iterating through the plurality of rows comprising the table in accordance with the order specified by the first row vector and determining, for a first node in the first hierarchy, a summary value corresponding to a first value of the first node and a second value of a second node descendent from the first node.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or statements or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the processing of hierarchical data in a database, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1B depicts an example of a table storing a representation of hierarchical data, in accordance with some example embodiments;

When practical, similar reference numbers denote similar structures, features, or elements.

DETAILED DESCRIPTION

To aggregate a sequence of rows in a relational database, a database management system may generate, based on one or more rows of data retrieved from at least one database table in the relational database, a summary value including, for example, an average, a count, a maximum, a medium, a minimum, a mode, a range, a sum, and/or the like. The aggregation may be performed by executing a structured query language (SQL) window function on the sequence of the rows. The SQL window function may be configured to aggregate successive partitions of rows from the sequence of rows, each of which containing an additional row that is not present in a previous partition. Furthermore, the order in which the aggregation is performed may be determined by an ORDER BY clause added to the window function. Nevertheless, a conventional SQL window function may not be optimized for operating on hierarchical data which, as noted, may include level-based hierarchical data associated with fixed depth hierarchies and parent-child hierarchical data associated with variable depths hierarchies. As such, in some example embodiments, a database management system may be configured to support hierarchical window functions for operating on hierarchical data. For example, a hierarchy window function may be executed to determine a summary value (e.g., an average, a count, a maximum, a medium, a minimum, a mode, a range, a sum, and/or the like) for one or more nodes in a hierarchy.

Figure 1A:
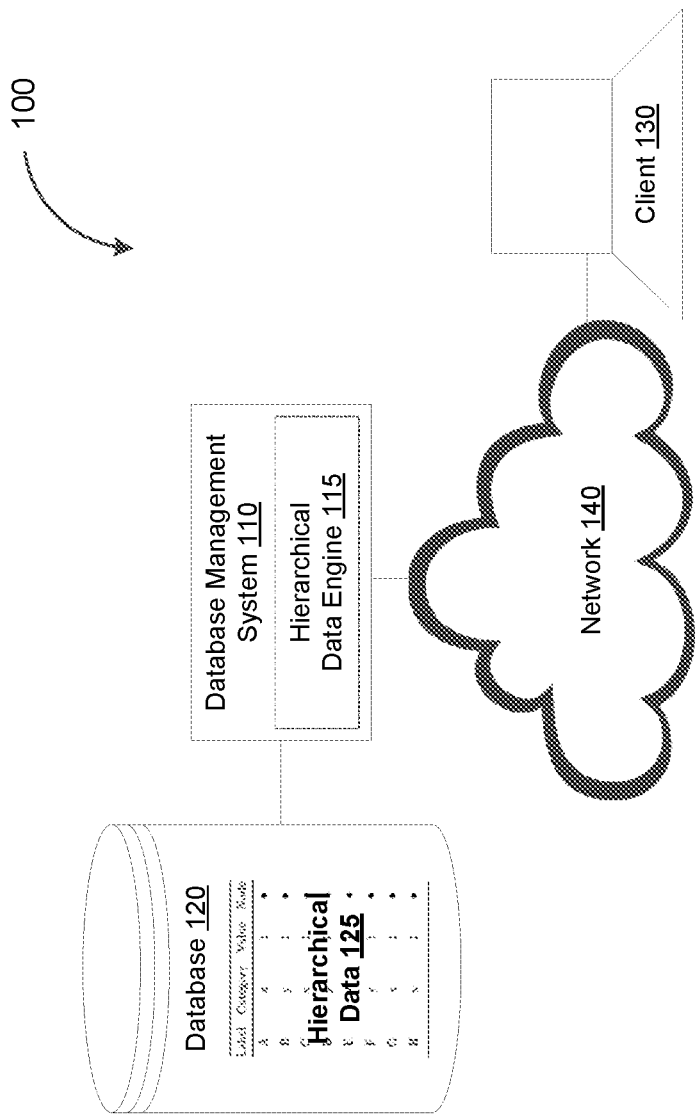
FIG. 1A depicts a system diagram illustrating a data storage system, in accordance with some example embodiments.

FIG. 1A depicts a system diagram illustrating a data storage system 100, in accordance with some example embodiments. Referring to FIG. 1A, the data storage system 100 may include a database management system 110 coupled with a database 120. The data storage system 100 may further include one or more clients including, for example, a client 130 and/or the like. The client 130 may be any processor-based device including, for example, a workstation, a desktop computer, a laptop computer, a tablet computer, a mobile device, a wearable apparatus, and/or the like. Moreover, as shown in FIG. 1A, the client 130 may be communicatively coupled with the database management system 110 via a network 140. The network 140 may be any wired and/or wireless network including, for example, a wide area network (WAN), a local area network (LAN), a virtual local area network (VLAN), a public land mobile network (PLMN), the Internet, and/or the like.

Referring again to FIG. 1A, the database management system 110 may include a hierarchical data engine 115 configured to support one or more functions operating on at least a portion of a hierarchical data 125 stored in the database 120. For instance, in some example embodiments, the hierarchical data engine 115 may support hierarchical window functions operation on at least the portion of the hierarchical data 125 stored in the database 120. The hierarchical data 125 may include level-based hierarchical data associated with fixed depth hierarchies. Alternatively and/or additionally, the hierarchical data 125 may include parent-child hierarchies associated with variable depth hierarchies. The hierarchical data engine 115 may support hierarchical window functions that are optimized for operating on level-based hierarchical data as well as parent-child hierarchical data. As noted, a hierarchy window function may be executed to determine a summary value (e.g., an average, a count, a maximum, a medium, a minimum, a mode, a range, a sum, and/or the like) for one or more nodes in a hierarchy.

The hierarchical data 125 may be stored in one or more tables in the database 120. For example, each node in the hierarchical data 125 may be stored as a corresponding row in a table in the database 120. Meanwhile, the database management system 110 may apply any indexing scheme in order to represent the structure of the hierarchical data 125 including, for example, a containment based labeling scheme, a path-based labeling scheme, an index-based scheme, and/or the like. Applying the indexing scheme may include assigning, to each node within the hierarchical data 125, one or more labels to reflect the relationship between different nodes. Accordingly, each node in the hierarchical data 125 may be assigned one or more labels that may enable and/or optimize the identification of parent nodes, children nodes, and/or sibling nodes, for instance, during the traversal of the hierarchical data 125. To further illustrate, FIG. 1B depicts an example of a table 150 storing a representation of the hierarchical data 125, in accordance with some example embodiments. As shown in FIG. 1B, each node in the hierarchical data 125 may be stored as a corresponding row in the database 120. Moreover, each node in the hierarchical data 125 may be assigned one or more labels (e.g., parent, pre/size/level (PSL) encoding, nested interval (NI), gap nested interval (GapNI), ordpath, and/or the like) configured to enable and/or optimize the identification of parent nodes, children nodes, and/or sibling nodes.

Figure 2A:
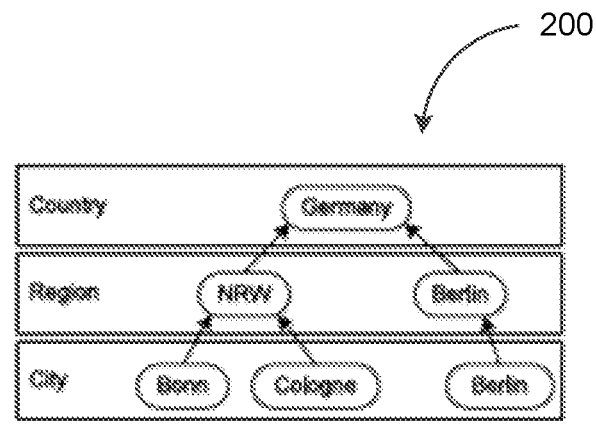
FIG. 2A depicts an example of a level-based hierarchy, in accordance with some example embodiments.

The hierarchical data 125 may include level-based hierarchical data associated with fixed depth hierarchies and/or parent-child hierarchical data associated with variable depths hierarchies. To further illustrate, FIG. 2A depicts an example of a level-based hierarchy 200, in accordance with some example embodiments. Referring to FIG. 2A, the nodes within a level-based hierarchy 200 may be organized into one or more levels. For instance, as shown in FIG. 2A, the nodes in the level-based hierarchy 200 may be organized into a "country" level, a "region" level, and a "city" level. Moreover, in the level-based hierarchy 200, nodes of a same type may occur only within a corresponding level of the level-based hierarchy 200. For example, FIG. 2A shows the nodes corresponding to individual countries as occurring only in the "country" level, the nodes corresponding to individual regions as occurring only in the "region" level, and the nodes corresponding to individual cities as occurring only in the "city" level. As such, the depth of the level-based hierarchy 200 may remain fixed, for example, to the quantity of levels present in the level-based hierarchy 200, even when additional nodes are added to the level-based hierarchy 200.

Figure 2B:
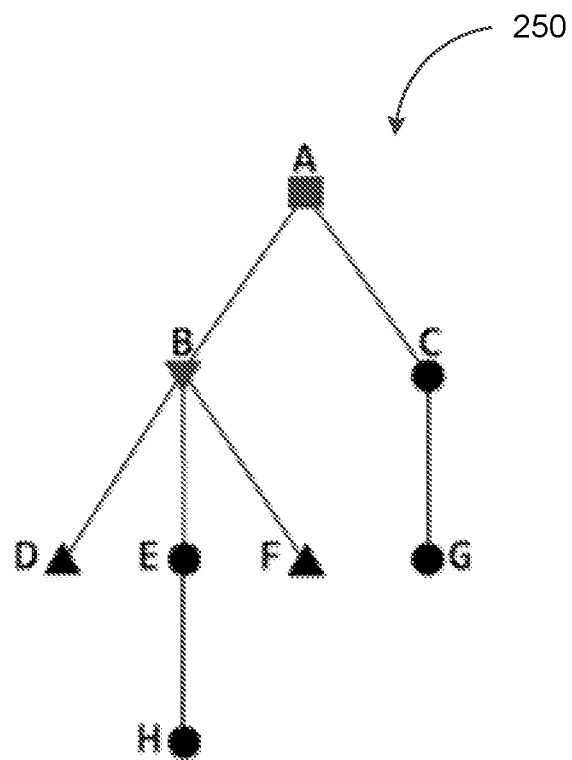
FIG. 2B depicts an example of a parent-child hierarchy, in accordance with some example embodiments.

FIG. 2B depicts an example of a parent-child hierarchy 250, in accordance with some example embodiments. Referring to FIGS. 2A-B, unlike the level-based hierarchy 200, the nodes in the parent-child hierarchy 250 may not be organized into one or more levels. As such, the depth of the parent-child hierarchy 250 may not be subject to any limitations as in the level-based hierarchy 200. Instead, the depth of the parent-child hierarchy 250 may change due to the addition of nodes to the parent-child hierarchy 250.

In some example embodiments, the hierarchical data engine 115 may execute a hierarchical window function configured to iterate through the hierarchical data 125 and determine, for each node in the hierarchical data 125, a summary value based on the value of each node and the values of all descendent or ascendant nodes. This summary value may be an average, a count, a maximum, a medium, a minimum, a mode, a range, a sum, and/or the like of the values of each node in the hierarchical data 125 and the values of all descendent or ascendant nodes. Moreover, this summary value may be determined by at least propagating a window that expands, with each successive iteration, to include one or more parent nodes when the hierarchical window function is being performed in a bottom up fashion or one or more children nodes when the hierarchical window function is being performed in a top down fashion.

Figure 2C:
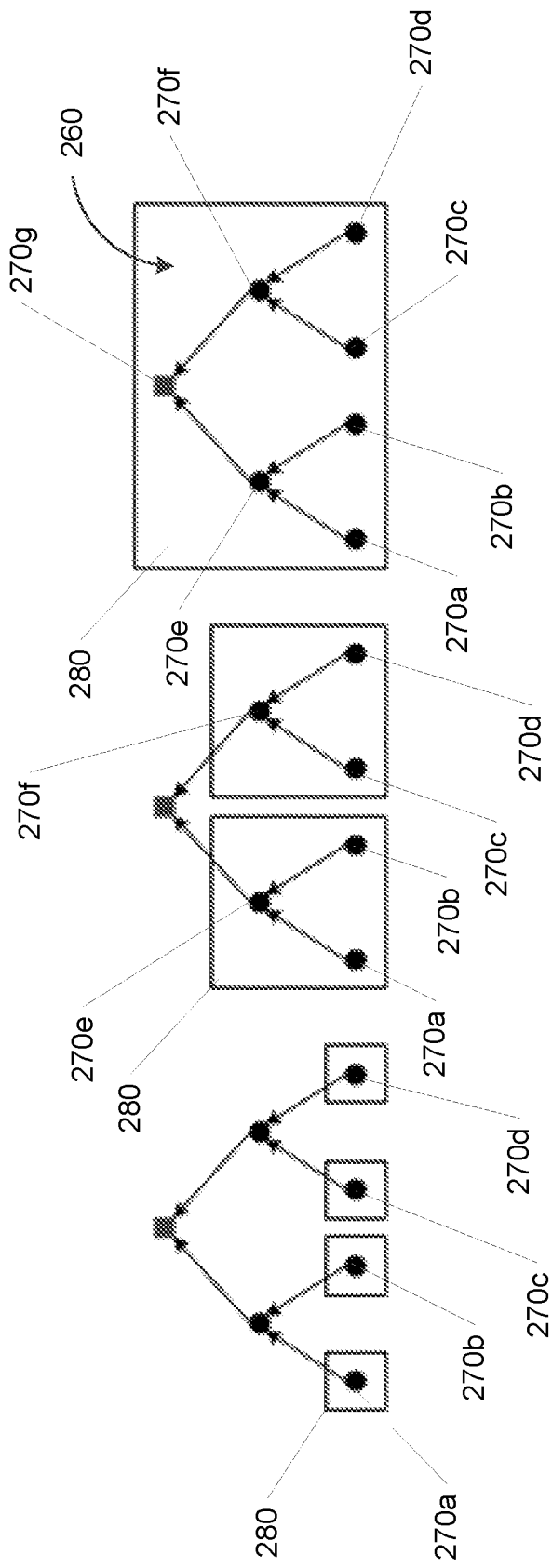
FIG. 2C depicts the propagation of a window during the performance of a hierarchical window function, in accordance with some example embodiments.

FIG. 2C depicts the propagation of a window 280 during the performance of a hierarchical window function on a hierarchy 260, in accordance with some example embodiments. Referring to FIG. 2C, the performance of the hierarchical window function may be require a bottom up traversal of the hierarchy 260. Accordingly, on the first iteration of the hierarchical window function, the window 280 may include the leaf nodes at the bottom of the hierarchy 260 including, for example, a first node 270a, a second node 270b, a third node 270c, and a fourth node 270d. The performance of the hierarchical window function may include generating, for each of the first node 270a, the second node 270b, the third node 270c, and the fourth node 270d, a summary value corresponding to the respective values of each node.

On the second iteration of the hierarchical window function, the window 280 may expand to include the parent nodes occupying the next level of the hierarchy 260 including, for example, a fifth node 270e and sixth node 270f. The performance of the hierarchical window function may include generating, for the fifth node 270e, a summary value based on the value of the fifth node 270e and the respective values of its children nodes (e.g., the first node 270a and the second node 270b). The performance of the hierarchical window function may further include generating, for the sixth node 270f, a summary value based on the value of the sixth node 270f and the respective values of its children nodes (e.g., the third node 270c and the fourth node 270d).

On the final iteration of the hierarchical window function, the window 280 may expand to further include the parent nodes occupying the next level of the hierarchy 260 including, for example, the seventh node 270g. The performance of the hierarchical window function may continue by at least generating, for the seventh node 270g, a summary value based on the value of the seventh node 270g as well as the respective values of its descendent nodes including, for example, the first node 270a, the second node 270b, the third node 270c, the fourth node 270d, the fifth node 270e, and the sixth node 270f.

Referring again to FIG. 2A, a hierarchical window function may be executed to iterate through the level-based hierarchy 200 and determine a summary value for each of the nodes occupying the "city" level, "region" level, and "country" level. In this case, executing the hierarchical window function may include propagating a window that expands, with each successive iteration of the hierarchical window function, to include nodes occupying an additional level of the level-based hierarchy 200. For example, executing the hierarchical window function on the level-based hierarchy 200 may include determining, for the nodes corresponding to the cities Bonn, Cologne, and Berlin, a summary value corresponding to the respective values of the nodes for the cities Bonn, Cologne, and Berlin. Executing the hierarchical window function on the level-based hierarchy 200 may also include determining, for the node corresponding to the North Rhine-Westphalia region, a summary value corresponding to the respective values of the nodes for the cities Bonn and Cologne. Furthermore, executing the hierarchical window function on the level-based hierarchy 200 may determine, for the node corresponding to the country Germany, a summary value corresponding to the respective values of the nodes associated with the North Rhine-Westphalia region, the Berlin region, the city Bonn, the city Cologne, and the city Berlin.

Referring to FIG. 2B, a hierarchical window function may also be executed to iterate through the parent-child hierarchy 200. For instance, executing the hierarchical window function on the parent-child hierarchy 250 may determine, for Node B, a summary value corresponding to the respective values of Node D, Node E, and Node F. Meanwhile, executing the hierarchical window function on the parent-child hierarchy 250 may also determine, for Node A, a summary value corresponding to the respective values of Node B and Node C.

To further illustrate, Table 1 below depicts the specification of a hierarchical window function.

TABLE 1

```
<window spec>          ::= [ <identifier> ]
                           [ <window partition> ]
                           [ <window order> ]
                           [ <window frame> ]
<window partition> ::= PARTITION BY <column list>
<window order>         ::= ORDER BY <sort spec list>
                           | HIERARCHIZE BY <node column>
                           [ <dataflow direction> ]
<sort spec list>       ::= <sort spec>
                           [ { <comma> <sort spec> } ... ]
<sort spec>   ::= <column> [ ASC | DESC ]
<dataflow direction> ::= BOTTOM UP | TOP DOWN
<frame spec>   ::= {ROWS | RANGE} BETWEEN <level> AND <level>
<hierar. frame spec> ::= LEVELS BETWEEN <level> AND <level>
<level>       ::= <abs level> | CURRENT ROW
<hierarhy level> ::= <abs level> | CURRENT NODE
<abs level>   ::= {<number >|UNBOUNDED}
                           {PRECEDING | FOLLOWING}
```

Referring to Table 1, in some example embodiments, a SQL window function may be extended to support hierarchical data such as, for example, the hierarchical data 125. For example, the SQL window function may be modified to include a HIERARCHIZE BY clause. The dataflow direction clause of the SQL window function may be modified to accept the keywords BOTTOM UP and TOP DOWN to specify the direction of the iteration performed as a part of executing the hierarchical window function. For example, the iteration may be performed in a top down fashion starting from a root node of the hierarchical data 125 and progressing towards the leaf nodes of the hierarchical data 125. Alternatively, the iteration may be performed in a bottom up fashion starting from the leaf nodes of the hierarchical data 125 and progressing towards a root node of the hierarchical data 125. Furthermore, the hierarchical window function may include a hierarchy frame specification clause with the keywords LEVELS BETWEEN to specify a frame including the levels in the hierarchical data 125 at which the iteration is performed.

In some example embodiments, the hierarchical data engine 115 may generate a visiting sequence data structure storing information that enables the execution of a hierarchical window function. For example, the visiting sequence data structure may include a first row vector enumerating the rows of the table 150 in an order corresponding to an order in which the nodes in the hierarchical data 125 are to be traversed during the execution of the hierarchical window function. The visiting sequence data structure may further include a second row vector enumerating the rows in the table 150 corresponding to parent nodes or children nodes in the hierarchical data 125. Alternatively and/or additionally, the visiting sequence data structure may include a third row vector storing, for each row in the table 150, the rows in the table 150 corresponding to the k-th ancestor node in the hierarchical data 125. The hierarchical data engine 115 may generate the visiting sequence data structure to include the third row vector when executing a framed hierarchical window function a framed hierarchical window function in which the iterations of the hierarchical window function extends to some but not all of the levels in the hierarchical data 125.

In some example embodiments, where the hierarchical window function requires the nodes in the hierarchical data 125 to be traversed in a top down fashion, the rows in the first row vector may be ordered such that the rows in the table 150 corresponding to the parent nodes in the hierarchical data 125 are visited before the rows in the table 150 corresponding to the children nodes in the hierarchical data 125. Alternatively, where the hierarchical window function requires the nodes in the hierarchical data 125 to be traversed in a bottom up fashion, the rows in the first row vector may be ordered such that the rows in the table 150 corresponding to children nodes in the hierarchical data 125 are visited before the rows in the table 150 corresponding to the parent nodes in the hierarchical data 125.

For example, for the parent-child hierarchy 250 shown in FIG. 2B, the hierarchical data engine 150 may generate a row vector [A, B, C, D, E, F, G, H] or [A, C, B, F, E, D, G, H] for a top-down traversal of the parent-child hierarchy 250. Alternatively, the hierarchical data engine 150 may generate a row vector [H, D, E, F, G, C, B, A] or [H, G, D, F, E, B, C, A] for a bottom-up traversal of the parent-child hierarchy 250.

Table 2 below depicts pseudo programming code for generating the visiting sequence data structure to include a row vector enumerating the rows in the table 150 in an order corresponding to an order in which the nodes in the hierarchical data 125 are traversed in a top down fashion.

TABLE 2

Algorithm 1: Generating top down visiting_sequence for indexing schemes using pre-order numbers

```
Data: Table 4.1
Result: visiting_sequence
forall row in Table 4.1 do
  | if row.Node exists then
  |   | visiting_sequence[row.Node.Pre] = row
  | end
end
```

Table 3 below depicts pseudo programming code for generating the visiting sequence data structure to include a row vector enumerating the rows in the table 150 in an order corresponding to an order in which the nodes in the hierarchical data 125 are traversed in a bottom up fashion.

TABLE 3

Algorithm 2: Generating bottom up visiting_sequence for indexing schemes using post-order numbers

```
Data: Table 4.1
Result: visiting_sequence
forall row in Table 4.1 do
  | if row.Node exists then
  |   | visiting_sequence[row.Node.Post] = row
  | end
end
```

The visiting sequence data structure may include another row vector enumerating the rows in the table 150 that correspond to parent nodes and/or children nodes in the hierarchical data 150. For instance, for the parent-child hierarchy 250 shown in FIG. 2B, the hierarchical data engine 150 may generate a row vector [A, B, C, E] identifying the rows in the table 150 corresponding to parent nodes present in the hierarchical data 125 and/or a row vector [A, B, C, E] identifying the rows in the table 150 corresponding to children nodes present in the hierarchical data 125.

Table 4 below depicts pseudo programming code for generating the visiting sequence data structure to include a row vector enumerating the rows in the table 150 corresponding to parent nodes in the hierarchical data 125.

TABLE 4

Algorithm 3: Computing parent_rows

```
Data: Table 4.1
Result: visiting_sequence
forall row in Table 4.1 do
  | if row.Node exists and row.Node is not root then
  |   | visiting_sequence[row.Index].parent_row =
  |   | visiting_sequence[row.Node.Parent]
  | end
end
```

Table 5 below depicts pseudo programming code for generating the visiting sequence data structure to include a row vector enumerating the rows in the table 150 corresponding to children nodes in the hierarchical data 125.

TABLE 5

Algorithm 4: Computing children_rows

```
Data: Table 4.1
Result: visiting_sequence
forall row in Table 4.1 do
  | if row.Node exists and row.Node is not root then
  |   | visiting_sequence[row.Parent].children_rows.add(row)
  | end
end
```

Alternatively and/or additionally, the visiting sequence data structure may include another row vector storing, for each row in the table 150, the rows in the table 150 corresponding to the k-th ancestor node in the hierarchical data 125. The hierarchical data engine 115 may generate this row vector in order to execute a framed hierarchical window function in which the iterations of the hierarchical window function are bound to a k quantity of levels preceding or a k quantity of levels subsequent to each of some but not all of the nodes in the hierarchical data 125. For example, in the example of the parent-child hierarchy 250 shown in FIG. 2B, the hierarchical data engine 115 may execute a hierarchical window function that is framed between the second level and the third level of the parent-child hierarchy 250. That is, the frame of the hierarchical window function may include the second level and the third level of the parent-child hierarchy 250 but exclude the first level and the fourth level of the parent-child hierarchy 250. As such, the hierarchical data engine 115 may execute the hierarchical window function to determine a summary value for each of Node B, Node D, Node E, Node F, Node C, and Node G. These summary values may be determined without taking into account the respective values of Node A and Node H because these nodes occupy levels outside of the specified frame.

In some example embodiments, the hierarchical data engine may generate the same visiting sequence data structure for the hierarchical data 125 regardless of the indexing scheme that is applied to represent the hierarchical data 125. As noted, applying an indexing scheme to the hierarchical data 125 may include assigning, to each node within the hierarchical data 125, one or more labels, one or more labels that enable and/or optimize the identification of parent nodes, children nodes, and/or sibling nodes. Although different indexing schemes (e.g., a containment based labeling scheme, a path-based labeling scheme, an index-based scheme, and/or the like) may be used to assign labels to the nodes in the hierarchical data 125, the same visiting sequence data structure may nevertheless be generated for the hierarchical data 125.

As noted, the hierarchical data engine 115 may generate the visiting sequence data structure to enable the execution of a hierarchical window function on at least a portion of the hierarchical data 125. For example, the hierarchical window function may be executed to perform an aggregation to generate a summary value for each of at least some of the nodes in the hierarchical data 125 including, for example, an average, a count, a maximum, a medium, a minimum, a mode, a range, a sum, and/or the like. Accordingly, the hierarchical window function may be executed based on the visiting sequence data structure which, as noted, may include a row vector enumerating the rows in the table 150 in an order corresponding to the order in which the nodes in the hierarchical data 125 are to be traversed during the execution of the hierarchical window function. The visiting sequence data structure may further include one or more row vectors identifying the rows in the table 150 corresponding to parent nodes and/or children nodes in the hierarchical data 125. Alternatively and/or additionally, the visiting sequence data structure may include a row vector identifying, for each row in the table 150, the rows in the table 150 corresponding to the k-th ancestor node in the hierarchical data 125. Based on the visiting sequence data structure, the hierarchical data engine 115 may traverse the rows in the table 150 while updating the value in one or more of the rows in the table 150 with the summary value that is determined for each of these rows.

For example, Table 6 below depicts pseudo programming code implementing a hierarchical window function for generating, in a bottom up fashion, a sum at each node in the hierarchical data 125. The sum at a node in the hierarchical data may correspond to the sum of the value at the node and the respective values of each of the node's children nodes. In a framed hierarchical window function, the sum at a node in the hierarchical data may correspond to the sum of the value at the node and the respective values of each of the node's children nodes within the specified frame of the hierarchical window function. Thus, in a framed hierarchical window function, the sum at a node in the hierarchical data 125 may include the value of the node and the values of only those children nodes that Occupy levels within the specified frame of the hierarchical window function.

TABLE 6

Algorithm 5: Implementation of a bottom up SUM hierarchical window function

```
Data: visiting_sequence
Result: visiting_sequence with updated values
forall row in visiting_sequence do
 | if row is not root then
 |  | row.parent_row.Value += row.Value
 | end
end
```

Table 7 below depicts pseudo programming code implementing a hierarchical window function for generating, in a top down fashion, a sum at each node in the hierarchical data 125.

TABLE 7

Algorithm 6: Implementation of a top down SUM hierarchical window function

```
Data: visiting_sequence
Result: visiting_sequence with updated values
forall row in visiting_sequence do
 | if row is not root then
 |  | row.Value += row.parent_row.Value
 | end
end
```

In some example embodiments, the hierarchical data engine 115 may execute the hierarchical window function to determine a sum at each of at least some of the nodes in the hierarchical data 125 based on the visiting sequence data structure. For example, the hierarchical window function may be executed by traversing, in the order specified by the visiting sequence data structure, the nodes occupying the specified frame of the hierarchical data 125 and accumulating values from each row in the table 150 corresponding a node occupying levels within the specified frame of the hierarchical window function either to or from the rows in the table 150 corresponding to the parent nodes, provided that these parent nodes also occupy levels within the specified frame of the hierarchical window function.

Figure 3A:
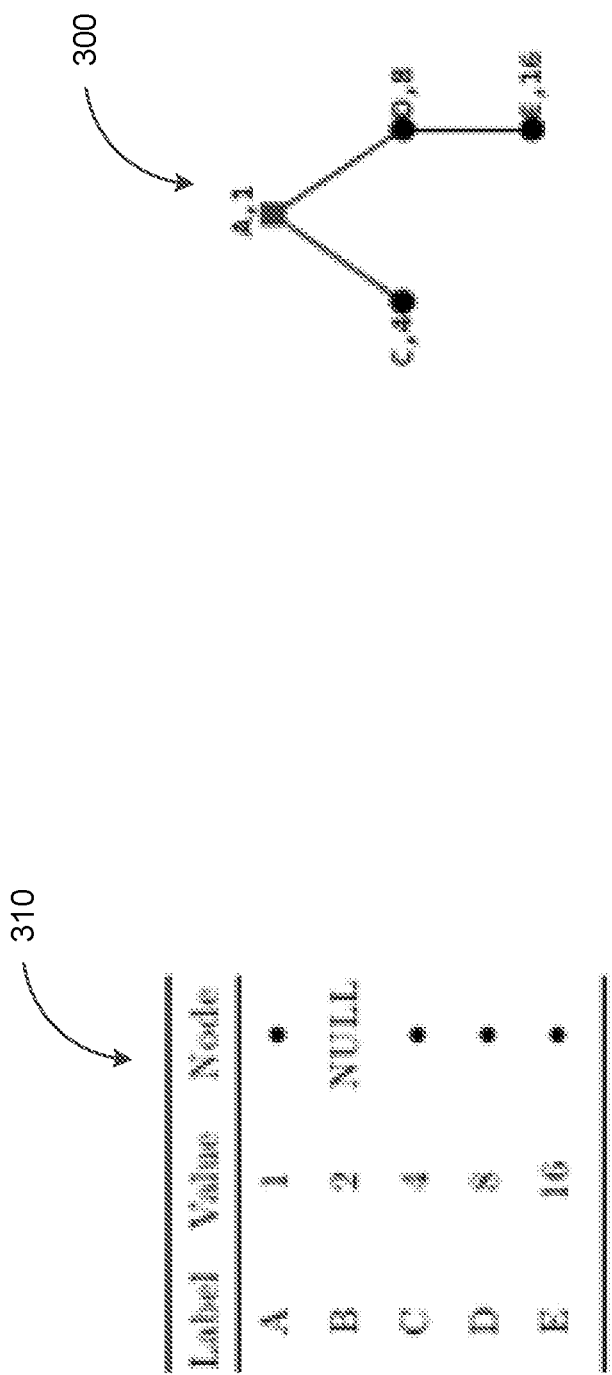
FIG. 3A depicts a result of executing an example of a hierarchical window function for computing a sum, in accordance with some example embodiments.

To further illustrate, FIG. 3A depicts a result of executing an example of a hierarchical window function for computing a sum, in accordance with some example embodiments. Referring to FIG. 3A, the hierarchical data engine 115 may execute a hierarchical window function to compute a sum over a hierarchy 300, which may be stored in the database 120 as a table 310. In order to execute the hierarchical window function, the hierarchical data engine 115 may generate the visiting sequence data structure to include a row vector [A, C, D, E], which may enumerate the rows in the table 310 in the order (e.g., top down) in which the nodes in the hierarchy 300 are to be traversed for executing the hierarchical window function. Node B may be excluded from the visiting sequence data structure because Node B is not part of the hierarchy 300.

The hierarchical window function may then be executed, based on the visiting sequence data structure, by iterating over rows in the table 310 in the order specified by the visiting sequence data structure. For instance, on the first iteration, the hierarchical data engine 115 may visit Node A but do nothing because Node A is a root node of the hierarchy 300. On the second iteration, the hierarchical data engine 115 may visit, in accordance with the visiting sequence data structure, Node C and adds the value of its parent node (e.g., Node A) to its own value. The hierarchical data engine 115 may update the value of Node C in a separate table based on this new value (e.g., the sum of the respective values of Node C and Node A). On the third iteration, the hierarchical data engine 115 may visit Node D and adds the value of its parent node (e.g., Node A) to its own value. The value of Node D (e.g., in another table) may be updated such that the new value of Node D may correspond to the sum of respective values of Node D and Node A. Finally, the hierarchical data engine 115 may visit Node E and adds the value of its parent node (e.g., Node D) to its own value. The hierarchical data engine 115 may update the value of Node E (e.g., in another table) such that the new value of Node E is the sum of respective values of Node E and Node D.

Table 8 below depicts pseudo programming code implementing a hierarchical window function for generating, in a bottom up fashion, a maximum value at each node in the hierarchical data 125. The maximum value at a node in the hierarchical data 125 may corresponding to the maximum value that is associated with the node and each of its children nodes within the specified frame of the hierarchical window function. For a framed hierarchical window function, the maximum value at a node in the hierarchical data 125 may be determined only based on the value of the node and the values of only those children nodes occupying levels within the specified frame of the hierarchical window function.

In some example embodiments, the hierarchical data engine 115 may execute the hierarchical window function to determine a maximum value or a minimum value at each of at least some of the nodes in the hierarchical data 125 based on the visiting sequence data structure. For example, the hierarchical window function may be executed by traversing, in the order specified by the visiting sequence data structure, the nodes occupying the specified frame of the hierarchical data 125. In doing so, the hierarchical data engine 115 may propagate a maximum value or a minimum value across the hierarchical data 125. For instance, to determine a maximum value at a node, the value of the node may be set to the value of a preceding node if the value of that preceding node is greater than the value of the current node. By contrast, to determine a minimum value at a node, the hierarchical data engine 115 may set the value of the current node to that of the preceding node if the value of the preceding node is less than the value of the current node. If the hierarchical window function is being performed in a top down fashion, the preceding node may be a parent node of the current node. By contrast, where the hierarchical window function is being performed in a bottom up fashion, the preceding node may be a child node of the current node.

TABLE 8

Algorithm 7: Implementation of a bottom up MAX hierarchical window function

```
Data: visiting_sequence
Result: visiting_sequence with updated values
forall row in visiting_sequence do
  | if row is not root and row.parent_row.Value < row.Value then
  |   | row.parent_row.Value = row.Value
  | end
end
```

Table 9 below depicts pseudo programming code implementing a hierarchical window function for generating, in a top down fashion, a maximum value at each node in the hierarchical data 125.

TABLE 9

Algorithm 8: Implementation of a top down MAX hierarchical window function

```
Data: visiting_sequence
Result: visiting_sequence with updated values
forall row in visiting_sequence do
  | if row is not root and row.Value < row.parent_row.Value then
  |   | row.Value = row.parent_row.Value
  | end
end
```

Table 10 below depicts pseudo programming code implementing a hierarchical window function for generating, in a bottom up fashion, an average value at each node in the hierarchical data 125. The average value at a node in the hierarchical data 125 may be determined based on the value of the node and the respective values of each of its children nodes within the specified frame of the hierarchical window function. For a framed hierarchical window function, the average value at a node in the hierarchical data 125 may be determined only based on the value of the node and the values of only those children nodes occupying levels within the specified frame of the hierarchical window function.

TABLE 10

Algorithm 9: Implementation of a bottom up AVG hierarchical window function

```
Data: visiting_sequence, Denominator is initially 1
Result: visiting_sequence with updated values
forall row in visiting_sequence do
  | if row is root then
  |   | row.Value /= row.Denominator
  |   | continue
  | end
  | row.parent_row.Value += row.Value
  | row.parent_row.Denominator += row.Denominator
  | row.Value /= row.Denominator
end
```

Table 11 below depicts pseudo programming code implementing a hierarchical window function for generating, in a top down fashion, an average value at each node in the hierarchical data 125.

TABLE 11

Algorithm 10: Implementation of a top down AVG hierarchical window function

```
Data: visiting_sequence, Denominator is initially 1
Result: visiting_sequence with updated values
forall row in visiting_sequence do
  | if row is root then
  |   | continue
  | end
  | row.Value += row.parent_row.Value * row.parent_row.Denominator
  | row.Denominator += row.parent_row.Denominator
  | row.Value /= row.Denominator
end
```

While a sum, maximum value, or minimum value at a node in the hierarchical data 125 may be determined based on the value of a preceding node (e.g., a child node in a bottom up traversal or a parent node in a top down traversal), determining an average value at a node may further require determining a quantity of ancestor nodes or descendent nodes within the specified frame of the hierarchical window function.

The average value over an i+1 quantity of nodes having values ($x_{i+1}$, $x_i$, . . . , $x_0$) may be determined based on Equation (1) or Equation (2) below.

$$AVG(x_{i+1}, x_i, \ldots, x_0) = \frac{AVG(x_i, \ldots, x_0) \cdot i + x_i}{i+1} \quad (1)$$

$$AVG(x_{i+1}, x_i, \ldots, x_0) = \frac{SUM(x_{i+1}, x_i, \ldots, x_0)}{i+1} \quad (2)$$

wherein value i in the denominator of Equation (1) and Equation (2) may denote the quantity of ancestor nodes or descendent nodes associated with a node. The value i may be computed, for example, based on the row vectors included in the visiting sequence data structure enumerating the parent nodes and/or children nodes present in the hierarchical data 125.

Figure 3B:
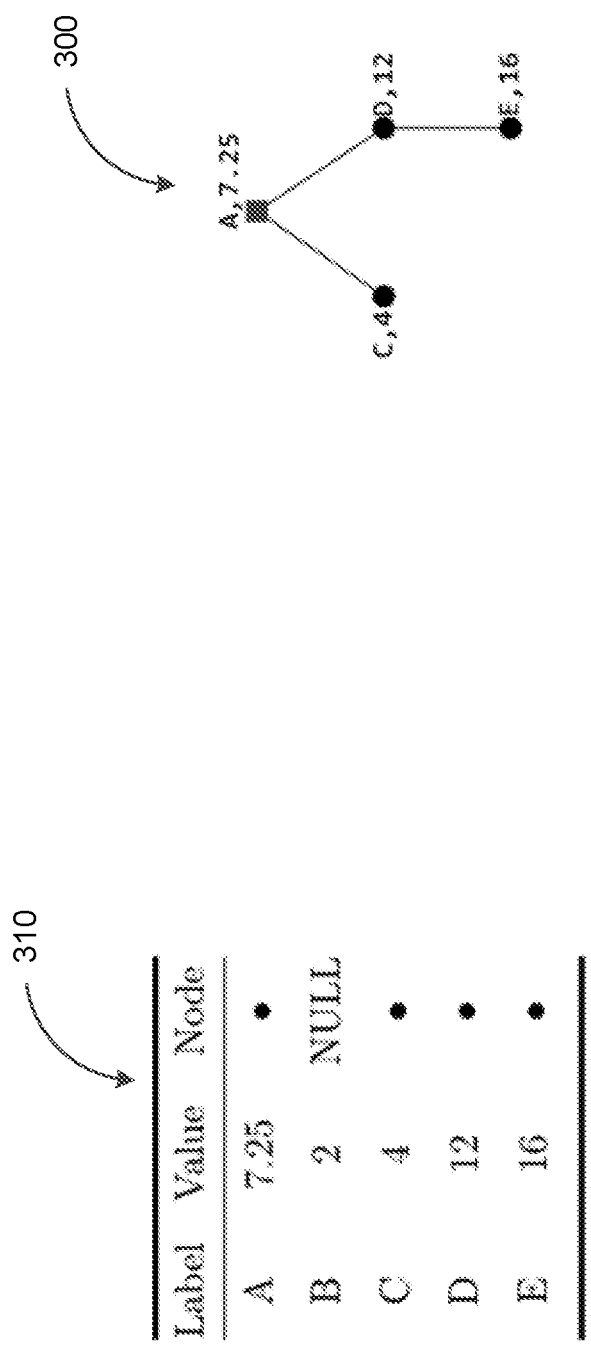
FIG. 3B depicts a result of executing an example of a hierarchical window function for computing an average, in accordance with some example embodiments.

To further illustrate, FIG. 3B depicts a result of executing an example of a hierarchical window function for computing an average, in accordance with some example embodiments. Referring to FIG. 3B, the hierarchical data engine 115 may execute a hierarchical window function to compute an average over the hierarchy 300 which, as noted may be stored in the database 120 as the table 310. That is, the hierarchy 300 shown in FIG. 3B may be an average of the hierarchy 300 shown in FIG. 3A. In order to execute the hierarchical window function, the hierarchical data engine 115 may generate the visiting sequence data structure to include a row vector [C, E, D, A], which may enumerate the rows in the table 310 in the order (e.g., bottom up) in which the nodes in the hierarchy 300 are to be traversed for executing the hierarchical window function. The hierarchical window function may then be executed, based on the visiting sequence data structure, by iterating over rows in the table 310 in the order specified by the visiting sequence data structure.

Table 12 below depicts an example of the iterations that may be performed during the execution of the hierarchical window function to determine an average value at each of Node C, Node E, Node D, and Node A in the hierarchy 300.

TABLE 12

Iteration 1. Visit Node C;
    A.Value += C.Value; (1+4 → 5)
    A.Denominator += C.Denominator; (1+1 → 2)
    C.Value /= C.Denominator; (4/1 → 4)
Iteration 2. Visit Node E;
    D.Value += E.Value; (8+16 → 24)
    D. Denominator += E.Denominator; (1+1 → 2)
    E. Value /= E.Denominator; (16/1 → 16)
Iteration 3. Visit Node D;
    A.Value += D.Denominator; (5+24 → 29)
    A.Denominator += D.Denominator; (2+2 → 4)
    D.Value /= D.Denominator; (24/2 → 12)
Iteration 4. Visit Node A;
    A.Value /= A.Denominator; (29/4 → 7.25)

In some example embodiments, the hierarchical data engine 115 may execute a framed hierarchical window function, which may iterate over a limited quantity of levels within a hierarchy. These levels may correspond to the specified frame of the hierarchical window function. When a hierarchical window function is framed, the hierarchical data engine 115 executing the framed hierarchical window function may determine a summary value for each of the nodes occupying levels within the specified frame but not for the nodes occupying levels outside of the specified frame. Moreover, the summary value that is determined for each of the nodes occupying levels within the specified frame may exclude the values of ancestor nodes and/or descendent nodes occupying levels outside of the specified frame. For example, to execute a hierarchical window function that is framed to a k quantity of levels, the hierarchical data engine 115 may determine, for each node occupying one of the k quantity of levels, a summary value that does not account for the values of nodes occupying levels outside of the k quantity of levels.

The value $x'_i$ of an i-th node within the k quantity of levels may be determined based on Equation (3) below.

$$x'_i(k) = x_i + x'_{i-i}(k) - x_{i-k-1}$$

For example, to perform a framed hierarchical window function to determine a sum for each of the nodes occupying a level within the framed k quantity of levels, the hierarchical data engine 115 may compute a sum for all of the nodes up to the k-th preceding level inclusively and later subtract from those sums the values of the nodes occupying levels above or below the specified frame. To compute an average value for each of the nodes occupying the framed k quantity of levels, the hierarchical data engine 115 may iterate the hierarchy once to generate a sum for each of the nodes occupying the framed k quantity of levels and a second time to determine a total quantity of nodes preceding each of the nodes occupying the framed k quantity of levels. The average value at each of the nodes occupying the framed k quantity of levels may be determined, based on Equation (2) above, by at least dividing the sum determined for each of the nodes occupying the framed k quantity of levels with the total quantity of nodes (e.g., the value i+1) preceding each of the nodes occupying the framed k quantity of levels.

Table 13 below depicts pseudo programming code implementing a framed hierarchical window function for generating, in a bottom up fashion, a sum at each node occupying a level in a hierarchy that is within a specified frame of the framed hierarchical window function.

TABLE 13

Algorithm 12: Implementation of a framed bottom up SUM hierarchical window function

```
Data: visiting_sequence with old values
Result: visiting_sequence with new values
forall row in visiting_sequence do
 |  if row is root then
 |   |  continue
 |  end
 |  row.parent_row.NewValue += row.NewValue
 |  if row.ancestor(k) exists then
 |   |  row.ancestor(k).NewValue -= row.Value
 |  end
end
```

Table 14 below depicts pseudo programming code implementing a framed hierarchical window function for generating, in a top down fashion, a sum at each node occupying a level in a hierarchy that is within a specified frame of the framed hierarchical window function.

TABLE 14

Algorithm 13: Implementation of a framed top down SUM hierarchical window function

```
Data: visiting_sequence with old values
Result: visiting_sequence with new values
forall row in visiting_sequence do
  | if row is root then
  | | continue
  | end
  | row.NewValue += row.parent_row.NewValue
  | if row.ancestor(k) exists then
  | | row.NewValue -= row.ancestor(k).Value
  | end
end
```

Table 15 below depicts pseudo programming code implementing a framed hierarchical window function for generating, in a bottom up fashion, an average value at each node occupying a level in a hierarchy that is within a specified frame of the framed hierarchical window function.

TABLE 15

Algorithm 14: Implementation of a framed bottom up AVG hierarchical window function

```
Data: visiting_sequence with old values
Result: visiting_sequence with new values
forall row in visiting_sequence do
  | if row is root then
  | | row.NewValue /= row.Denominator
  | | continue
  | end
  | if row.ancestor(k) exits then
  | | row.ancestor(k).NewValue -= row.Value
  | | row.ancestor(k).Denominator--
  | end
  | row.parent_row.NewValue += row.NewValue
  | row.parent_row.Denominator += row.Denominator
  | row.NewValue /= row.Denominator
end
```

Table 16 below depicts pseudo programming code implementing a framed hierarchical window function for generating, in a bottom up fashion, an average value at each node occupying a level in a hierarchy that is within a specified frame of the framed hierarchical window function.

TABLE 16

Algorithm 15: Implementation of a framed top down AVG hierarchical window function

```
Data: visiting_sequence with old values
Result: visiting_sequence with new values
forall row in visiting_sequence do
  | if row is root then
  | | continue
  | end
  | if row.ancestor(k) exists then
  | | row.NewValue -= row.ancestor(k).Value
  | | row.Denominator -= row.ancestor(k).Denominator
  | end
  | row.NewValue += row.parent_row.NewValue *
  | row.parent_row.Denominator
  | row.Denominator += row.parent_row.Denominator
  | row.NewValue /= row.Denominator
end
```

Table 17 below depicts pseudo programming code implementing a framed hierarchical window function for generating, in a bottom up fashion, a maximum value at each node occupying a level in a hierarchy that is within a specified frame of the framed hierarchical window function.

TABLE 17

Algorithm 16: Implementation of a framed bottom up MAX hierarchical window function

```
Data: visiting_sequence with old values
Result: visiting_sequence with new values
forall row in visiting_sequence do
  | parent_row = row
  | while 0 <k-- do
  | | parent_row = parent_row.parent_row
  | | if parent_row not exists then
  | | | break
  | | end
  | | if parent_row.NewValue <row.Value then
  | | | parent_row.NewValue = row.Value
  | | end
  | end
end
```

Table 18 below depicts pseudo programming code implementing a framed hierarchical window function for generating, in a bottom up fashion, a maximum value at each node occupying a level in a hierarchy that is within a specified frame of the framed hierarchical window function.

TABLE 18

Algorithm 17: Implementation of a framed top down MAX hierarchical window function

```
Data: visiting_sequence with old values
Result: visiting_sequence with new values
forall row in visiting_sequence do
  | parent_row = row
  | while 0 <k-- do
  | | parent_row = parent_row.parent_row
  | | if parent_row not exists then
  | | | break
  | | end
  | | if row.NewValue <parent_row.Value then
  | | | row.NewValue = parent_row.Value
  | | end
  | end
end
```

Figure 3C:
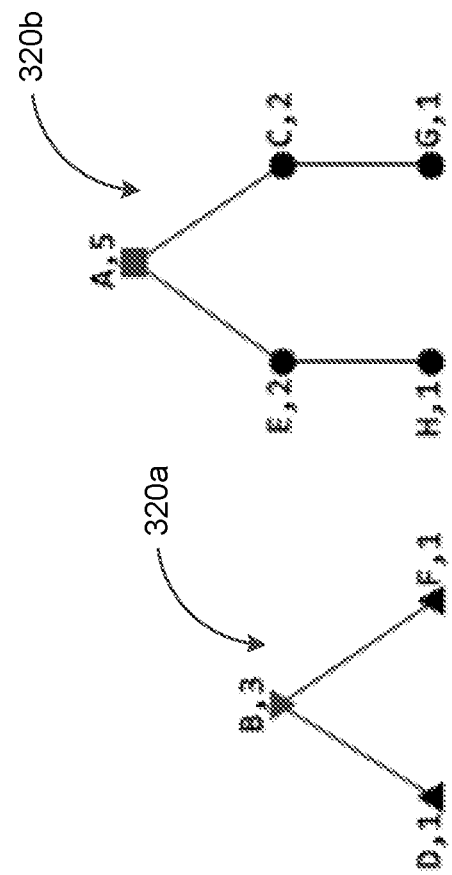
FIG. 3C depicts a result of executing an example of a partitioned hierarchical window function, in accordance with some example embodiments.

A hierarchical window function may be executed on separate partitions of a hierarchy, which may be divided based on the values of one or more of the labels associated with each of the nodes. As such, in some example embodiments where the hierarchical window function is to be executed on separate partitions of a hierarchy, the visiting sequence data structure may generated subsequent to the partitioning of the hierarchy such that the visiting sequence data structure may include row vector enumerating the order for traversing the nodes occupying each partition of the hierarchy. To further illustrate, FIG. 3C depicts a result of executing an example of a partitioned hierarchical window function to determine a sum for each node in two separate partitions of the parent-child hierarchy 250. As shown in FIG. 3C, the parent-child hierarchy 250 may be divided into a first partition 320*a* and a second partition 320*b*. Accordingly, the hierarchical data engine 115 may execute a hierarchical window function to determine a sum at each of the nodes within the first partition 320*a* and the second partition 320*b*. The hierarchical data engine 115 may generate a visiting sequence data structure for each of the first partition 320*a* and the second partition 320*b*. Moreover, the hierarchical data engine 115 may execute the hierarchical window function by at least traversing each of the first partition 320*a* and the second partition 320*b* in an order specified by the respective visiting sequence data structures of the first partition 320*a* and the second partition 320*b*.

The partitioning of the parent-child hierarchy 250 may alter the structure that is present in the parent-child hierarchy 250. For example, the partitioning of the parent-child hierarchy 250 may alter the parent-child and sibling relationships that are present in the parent-child hierarchy 250 such that the nodes in the first partition 320a and the second partition 320b may be associated with different parent nodes, children nodes, and/or sibling nodes than before the partitioning. In some example embodiments, the technique for partitioning the parent-child hierarchy 250 may be dependent upon the indexing scheme used to generate the representation of the parent-child hierarchy for storage in the database 120. As noted, applying an indexing scheme to the parent-child hierarchy 250 may include assigning, to each node within the parent-child hierarchy 250, one or more labels that may enable and/or optimize the identification of parent nodes, children nodes, and/or sibling nodes.

Figure 3D:
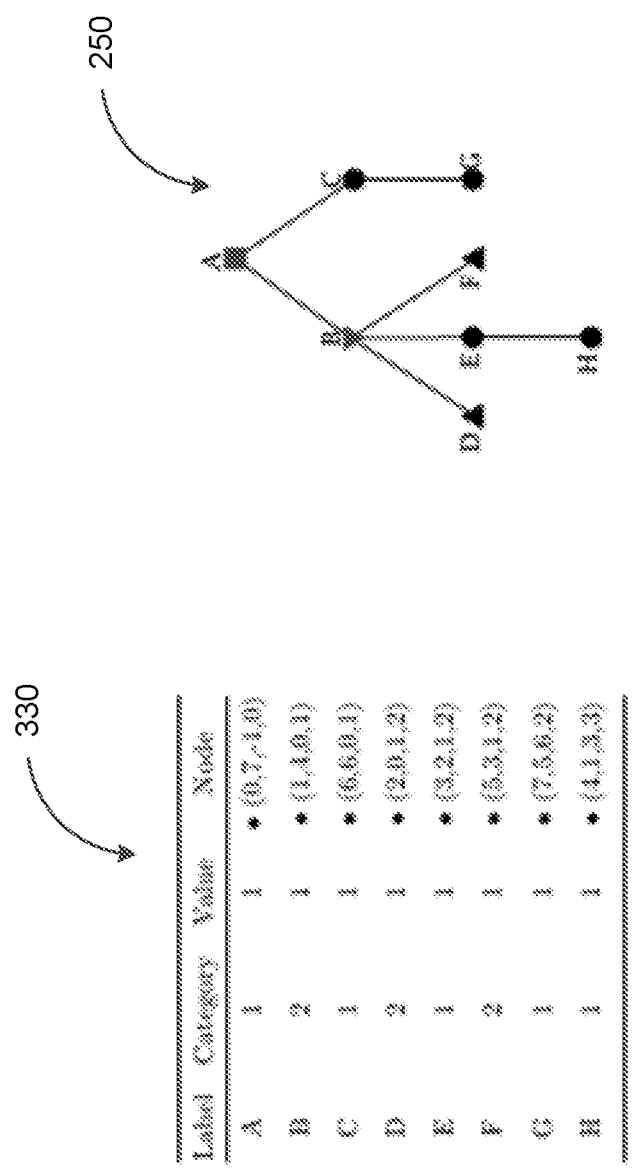
FIG. 3D depicts an example of a hierarchy indexed in accordance with a Pre, Post, Parent, and Level (PPPL) indexing scheme, in accordance with some example embodiments.

In some example embodiments, a Pre, Post, Parent, and Level (PPPL) indexing scheme may be applied in order to assign, to each node within the parent-child hierarchy 250, one or more labels that may enable and/or optimize the identification of parent nodes, children nodes, and/or sibling nodes. FIG. 3D depicts the parent-child hierarchy 250 being indexed in accordance with a Pre, Post, Parent, and Level (PPPL) indexing scheme, in accordance with some example embodiments. As shown in FIG. 3D, applying a Pre, Post, Parent, and (Level) indexing scheme may assign, to each node in the parent-child hierarchy 250, a four-tuple label that includes a pre-order number, a post-order number, a parent pre-order number, and a level.

For example, consider a hierarchy with the nodes l, m, and n. The level of the nodes l, m, and n may correspond to a distance of each node from a root node of the hierarchy. If a pre-order traversal of the hierarchy visits the node/before the node m and the node m before the node n, then the nodes may be assigned pre-order numbers having the property $L_{pre}<M_{pre}<N_{pre}$. Alternatively, if a post-order traversal of the hierarchy visits the node/before the node m and the node m before the node n, then the nodes may be assigned post-order numbers having the property $L_{post}<M_{post}<N_{post}$.

When a Pre, Post, Parent, and Level (PPPL) indexing scheme is used, partitioning the parent-child hierarchy 250 may require modifying the parent pre-order numbers and the levels of the nodes in the parent-child hierarchy 250 but not the pre-order number labels and the post-order number labels of the nodes. It should be appreciated the performance of a hierarchical window function may not require the levels of the nodes in the parent-child hierarchy 250. Moreover, the exact pre-order numbers and post-order numbers of the nodes may also be irrelevant for hierarchical window functions as long as these numbers remain in the same order such that a node having a greater pre-order number and/or post-order number is visited after a node having a lesser pre-order number and/or post-order number.

In some example embodiments, the partitioning of the parent-child hierarchy 250 may require computing a map of pre-order numbers to the rows of a table storing the parent-child hierarchy 250. For example, the map of pre-order numbers associated with the parent-child hierarchy 250 may be an array [0, . . . , 7]=(A, B, D, E, H, F, C, G). Table 19 below depicts pseudo programming code for computing the map of pre-order numbers to the rows of the table. As shown in Table 19, the map of pre-order numbers to rows of the table storing the parent-child hierarchy 250 may be computed by iterating over the table and storing, in the array, the pre-order number of each row that corresponds to a node in the parent-child hierarchy 250.

TABLE 19

Algorithm 18: Computing a map of pre-order numbers to rows of a table

Data: a table
Result: pre_order_array that maps pre-order numbers to rows
forall row in table do
   if row.Node exists then
      pre_order_array[row.Node.Pre] = row
   end
end Based on the map of pre-order numbers to rows in the table storing the parent-child hierarchy 250, the partitioning of the parent-child hierarchy 250, for example, based on the "category" associated with each node, may include traversing the parent-child hierarchy 250 to determine the parent node for each node in the first partition 320a and the second partition 320b. Table 20 below depicts pseudo programming code for partitioning a hierarchy. As shown in Table 20, the portioning of the parent-child hierarchy 250 may include iterating over the corresponding table and replacing each row that corresponds to a parent node belonging to another partition with a row corresponding to a next ancestor node in the same partition. If all of a node's ancestor nodes are in a different partition, then that node becomes a root node of its current partition. It should be appreciated that the partitioning of the parent-child hierarchy 250 may be permissible but not necessary to alter the values of a node's pre-order number, post-order number, and level.

TABLE 20

Algorithm 19: Partitioning of PPPL for aggregate hierarchical window functions

Data: a table
Result: pre_order_array that maps pre-order numbers to rows
forall row in table do
   if row.Node not exists then
      continue
   end
   row.Node.NewParent = row.Node.OldParent
   while row.Node.NewParent exists and row.Partition != pre_order_array[row.Node.NewParent].Partition do
      row.Node.NewParent =
         pre_order_array[row.Node.NewParent].Node.OldParent
   end
end Table 21 depicts the iterations that are performed to partition the parent-child hierarchy 250 into the first partition 320a and the second partition 320b. The iterations may include visiting Node A, Node C, Node D, Node E, Node F, Node G, and Node H. While visiting Node B, the hierarchical data engine 115 may identify Node B as a root node of the first partition 320a. Meanwhile, when visiting Node E, the hierarchical data engine 115 may change the parent node of Node E from Node B to Node A.

TABLE 21

| Iteration 1. | Visit A; |
| Iteration 2. | Visit B; B.Parent = NO_PARENT; |
| Iteration 3. | Visit C; |
| Iteration 4. | Visit D; |
| Iteration 5. | Visit E; E.Parent = A.Pre; |
| Iteration 6. | Visit F; |
| Iteration 7. | Visit G; |
| Iteration 8. | Visit H; |

In some example embodiments, the hierarchical data engine 115 may support a make node function in order to return new hierarchies corresponding to the first partition 320a and the second partition 320b that are formed by dividing the parent-child hierarchy 250. The make node function may take one or many node columns as parameters and returns a new hierarchy containing the nodes appearing in these node columns. These parameters may be passed directly as arguments to the make node function or passed as part of the HIERARCHIZE BY clause in the same manner as for other hierarchical window functions. In addition, the parameters of the make node function may also include one or more partitioning columns, which may be passed to the make node function as part of the PARTITION_BY clause of the corresponding hierarchical window function.

In some example embodiments, the hierarchical data engine 115 may support the joining of two hierarchies. Joining two relational tables without a join condition may return the Cartesian product of the two tables, which may include every possible combination of rows in two tables without matching any column values. Meanwhile, the Cartesian product of two graphs G and H, denoted as G H, may be a graph with the vertex set V (G)×V (H), in which two vertices (g,h) and (g', h') may be adjacent if gg' E E(G) and h=h' or g=g' and hh'∈E(H). Cartesian products may be associative and commutative. As shown in Equations (4) and (5) below, this means that the result of joining two or more tables or graphs does not depend on order in which the tables or graphs are joined. The result of joining two tables further does not depend on whether a first table is joined with a second table or the second table is joined with the first table.

$$(GH)J=G(HJ) \quad (4)$$

$$GH=HG \quad (5)$$

Figure 3E:
FIG. 3E depicts an example of joining two hierarchies, in accordance with some example embodiments.
Figure 3E:
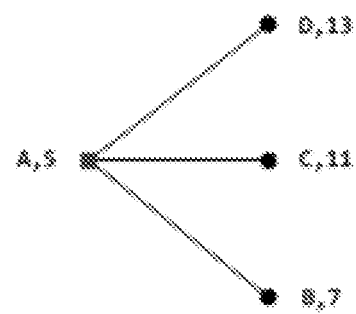
Figure 3E:
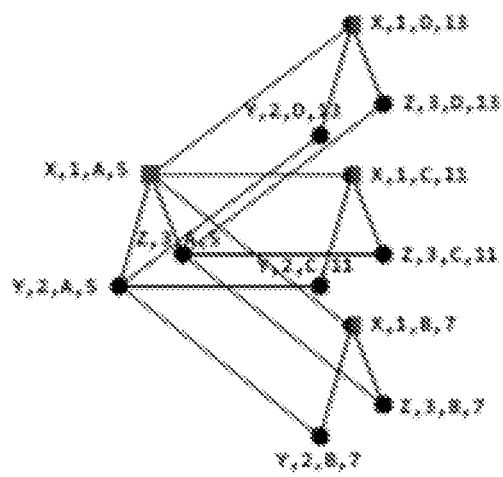

To further illustrate, FIG. 3E depicts the joining of a first hierarchy 340a and a second hierarchy 340b to form a result 340c. Referring to FIG. 3E, the result 340c may be generated by determining the Cartesian product of the tables corresponding to each of the first hierarchy 340a and the second hierarchy 340b.

In some example embodiments, the hierarchical data engine 115 may support determining the rooted product of two or more hierarchies. The rooted product of G o H of a hierarchy G and another hierarchy H may be defined as a graph obtained taking one copy of the hierarchy G and n copies of hierarchy H and identifying, for every vertex $u_i$ of the hierarchy G, the vertex $u_i$ with the root node of the $i^{th}$ copy of the hierarchy H for every 1<i<n. The rooted product G o H may be associative but not commutative. As Equations (6) and (7) below shows, this means that the result of a rooted product does not depends on an order in which the rooted product is performed but does depend on whether a first hierarchy is joined with a second hierarchy or the second hierarchy is joined with the first hierarchy.

$$(GoH)oJ=Go(HoJ) \quad (6)$$

$$GoH \ne HoG \quad (7)$$

Figure 3F:
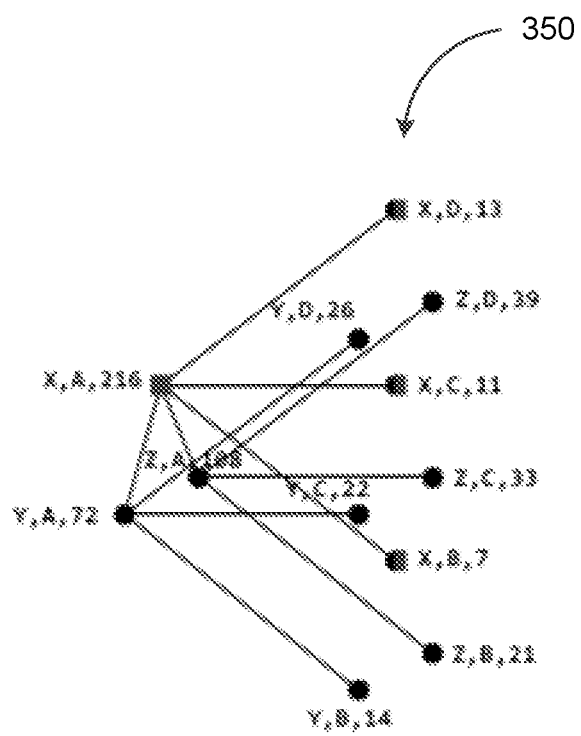
FIG. 3F depicts an example of a hierarchical window function performed over a rooted product of two hierarchies, in accordance with some example embodiments.
Figure 3G:
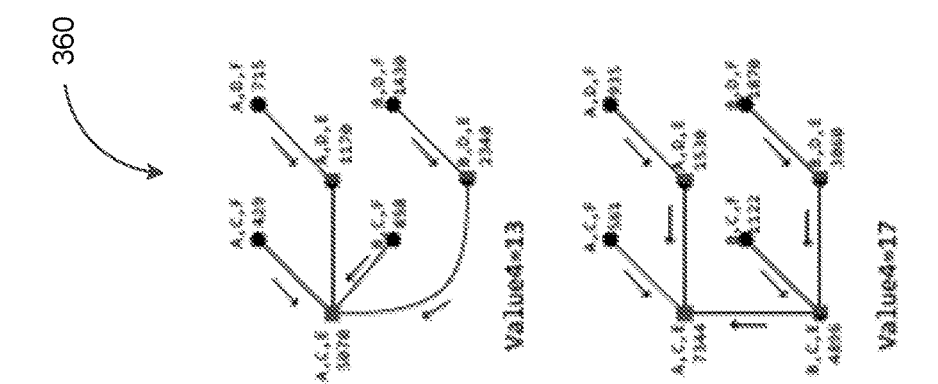
FIG. 3G depicts an example of a hierarchical window function performed over a rooted product of three hierarchies, in accordance with some example embodiments.
Figure 3G:
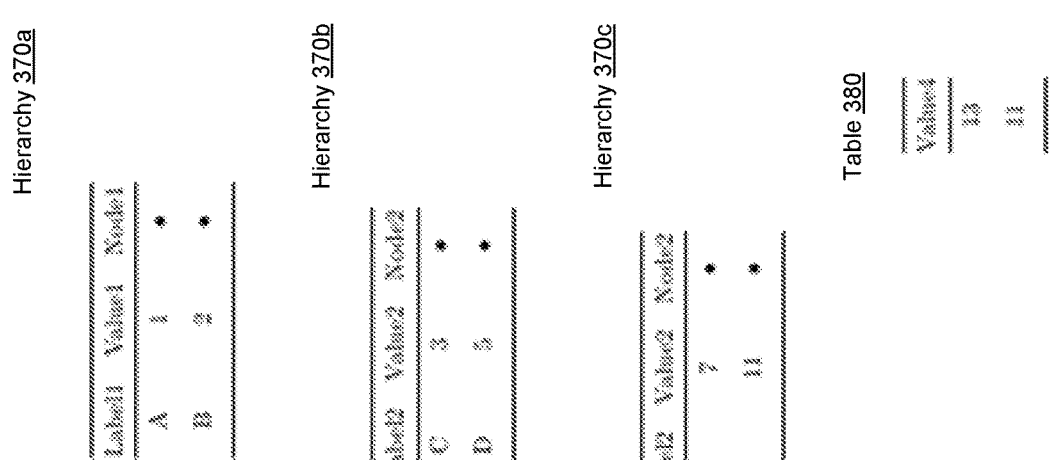

The rooted product of two or more hierarchies may be significant because the rooted product of two or more hierarchies remains a hierarchy that preserves the directionality present in the original hierarchies without creating any cycles and preserves the quantity of parent nodes with the exception of the root of the second hierarchy. In some example embodiments, the hierarchical data engine 115 may be configured to perform a hierarchical window function to generate a summary value (e.g., an average, a count, a maximum, a medium, a minimum, a mode, a range, a sum, and/or the like) for each node in a rooted product of two or more hierarchies. For example, FIG. 3F depicts the result 350 of performing a hierarchical window function to determine a sum at each node in a rooted product of the first hierarchy 340a and the second hierarchy 340b shown in FIG. 3E. Meanwhile, FIG. 3G depicts the result 360 of performing a hierarchical window function to determine a sum for each node in the rooted product of a first hierarchy 370a, a second hierarchy 370b, a third hierarchy 370c, and a table 380.

Figure 4:
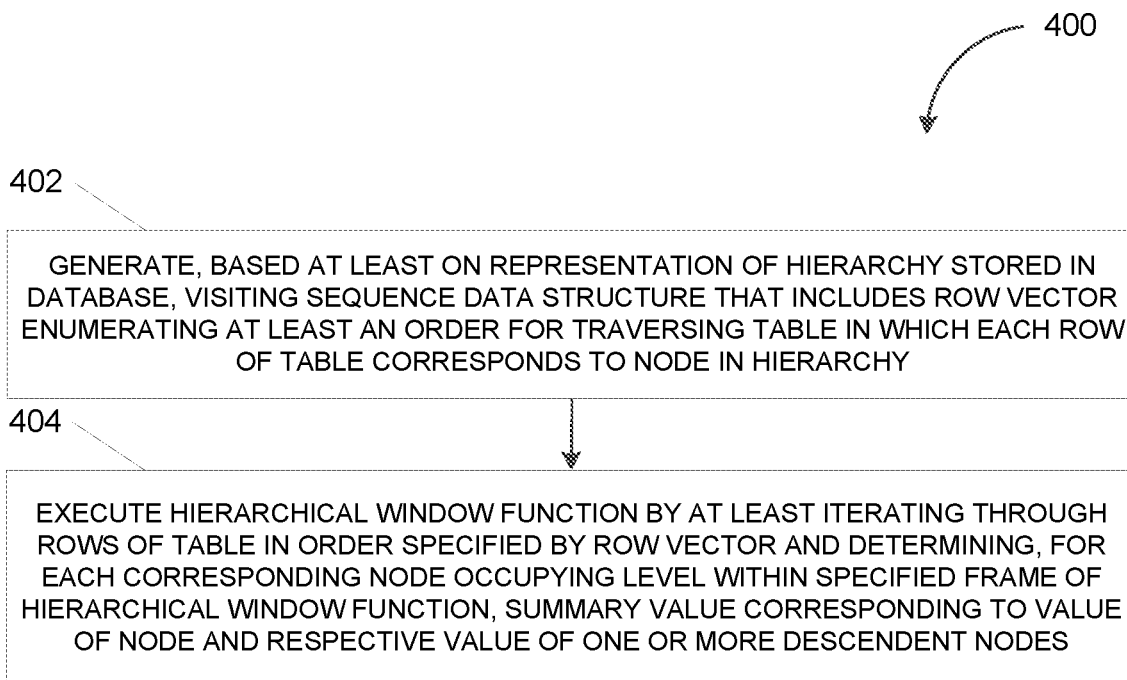
FIG. 4 depicts a flowchart illustrating a process for processing hierarchical data, in accordance with some example embodiments.

FIG. 4 depicts a flowchart illustrating a process 400 for processing hierarchical data, in accordance with some example embodiments. Referring to FIGS. 1A-B, 2A-C, 3A-G, and 4, the process 400 may be performed by the database management system 110, for example, the hierarchical data engine 115. For example, the hierarchical data engine 115 may perform the process 400 in order to execute a hierarchical window function to determine, for each node occupying a level with a specified frame of the hierarchical window function, a summary value including, for example, an average, a count, a maximum, a medium, a minimum, a mode, a range, a sum, and/or the like.

At 402, the hierarchical data engine 115 may generate, based at least on a representation of a hierarchy stored in a database, a visiting sequence data structure that includes a row vector specifying an order for traversing a table in which each row of the table corresponds to a node in the hierarchy. In some example embodiments, the hierarchical data engine 115 may generate a visiting sequence data structure storing information that enables the execution of a hierarchical window function. The visiting sequence data structure may include a row vector enumerating the rows of the table 150 in an order corresponding to an order in which the nodes in the hierarchical data 125 are to be traversed during the execution of the hierarchical window function. For example, for the parent-child hierarchy 250 shown in FIG. 2B, the hierarchical data engine 150 may generate a row vector [A, B, C, D, E, F, G, H] or [A, C, B, F, E, D, G, H] for a top-down traversal of the parent-child hierarchy 250. Alternatively, the hierarchical data engine 150 may generate a row vector [H, D, E, G, C, B, A] or [H, G, D, F, E, B, C, A] for a bottom-up traversal of the parent-child hierarchy 250.

The visiting sequence data structure may include another row vector enumerating the rows in the table 150 that correspond to parent nodes and/or children nodes in the hierarchical data 150. For instance, for the parent-child hierarchy 250 shown in FIG. 2B, the hierarchical data engine 150 may generate a row vector [A, B, C, E] identifying the rows in the table 150 corresponding to parent nodes present in the hierarchical data 125 and/or a row vector [A, B, C, E] identifying the rows in the table 150 corresponding to children nodes present in the hierarchical data 125. Alternatively and/or additionally, the visiting sequence data structure may include a row vector storing, for each row in the table 150, the rows in the table 150 corresponding to the k-th ancestor node in the hierarchical data 125. The hierarchical data engine 115 may generate this row vector in order to execute a framed hierarchical window function in which the iterations of the hierarchical window function are bound to a k quantity of levels preceding or a k quantity of levels subsequent to each of some but not all of the nodes in the hierarchical data 125.

At 404, the hierarchical data engine 115 may execute a hierarchical window function by at least iterating through the rows in the table in the order specified by row vector and determining, for each corresponding node occupying a level within a specified frame of the hierarchical window function, a summary value corresponding to a value of the node and a respective values of one or more descendent nodes. For example, the hierarchical window function may be executed to perform an aggregation to generate a summary value for each of at least some of the nodes in the hierarchical data 125 including, for example, an average, a count, a maximum, a medium, a minimum, a mode, a range, a sum, and/or the like. Accordingly, the hierarchical window function may be executed based on the visiting sequence data structure which, as noted, may include a row vector enumerating the rows in the table 150 in an order corresponding to the order in which the nodes in the hierarchical data 125 are to be traversed during the execution of the hierarchical window function.

As shown in FIG. 3A, the hierarchical data engine 115 may execute a hierarchical window function to compute a sum over the hierarchy 300, which may be stored in the database 120 as the table 310. In order to execute the hierarchical window function, the hierarchical data engine 115 may generate the visiting sequence data structure to include a row vector [A, C, D, E], which may enumerate the rows in the table 310 in the order (e.g., top down) in which the nodes in the hierarchy 300 are to be traversed for executing the hierarchical window function. Meanwhile, Node B may be excluded from the visiting sequence data structure because Node B is not part of the hierarchy 300

Figure 5:
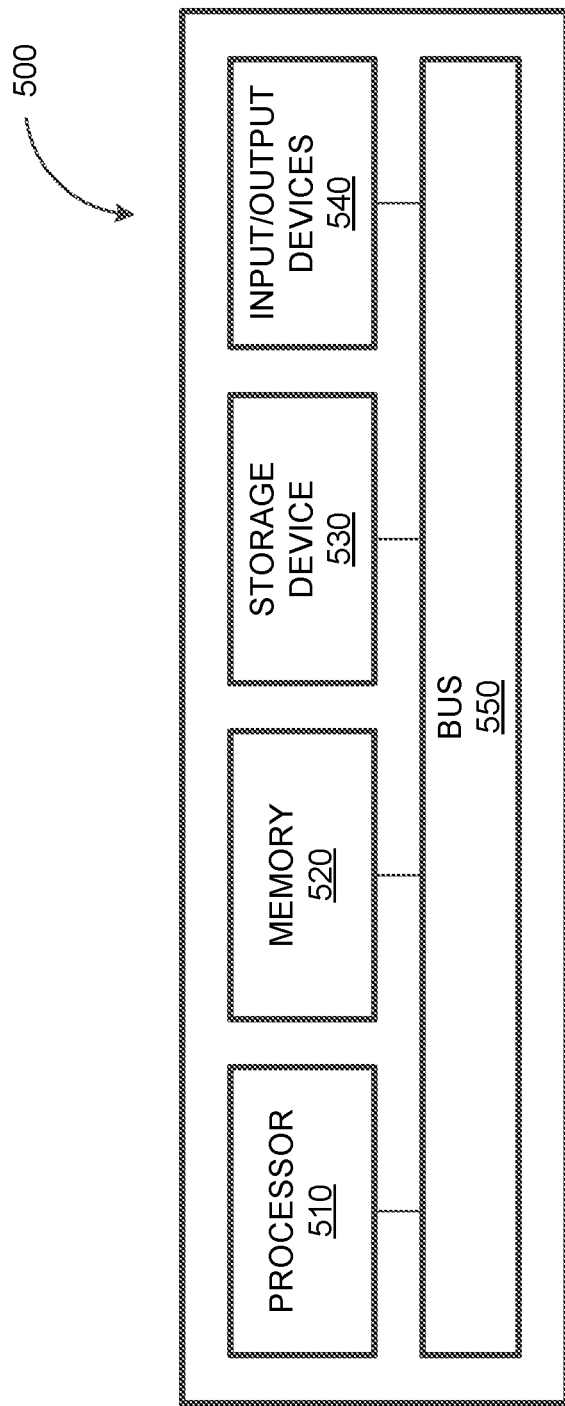
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the database management system 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the database management system 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B," and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   generating, based at least on a representation of a first hierarchy stored in a database, a visiting sequence data structure for executing a hierarchical window function on the first hierarchy, the first hierarchy being stored in a table in the database with each node of the first hierarchy being stored in one of a plurality of rows comprising the table, the hierarchical window function iterating through the first hierarchy to determine, for each node of a plurality of nodes in the first hierarchy, a summary value corresponding to a first value of the node and a second value of one or more ascendant nodes or descendent nodes of the node, the first hierarchy including at least one node that is stored in non-consecutive rows of the table as an ascendant node or a descendant node of the at least one node such that traversing the first hierarchy in a bottom up order or a top down order requires traversing the plurality of rows of the table in a non-consecutive order as indicated by the visiting sequence data structure, the visiting sequence data structure including a first row vector enumerating the plurality of rows in an order in which the plurality of rows in the table are to be traversed during the executing of the hierarchical window function in order to traverse the plurality of nodes in the first hierarchy to include, with each successive iteration of the hierarchical window function, at least one ascendant node or descendent node of a node included in a previous iteration of the hierarchical window function; and
   executing the hierarchical window function by at least iterating through the plurality of rows comprising the table, the plurality of rows being iterated in the order specified by the first row vector, and determining, a first value of a first node and a second value of a second node ascendant or descendent from the first node, a first summary value.

2. The system of claim 1, wherein the summary value comprises an average, a count, a maximum, a medium, a minimum, a mode, a range, and/or a sum of the first value of the first node and the second value of the second node.

3. The system of claim 1, wherein the execution of the hierarchical window function further comprises determining, for a third node ascendant or descendent from the first node and/or the second node, a second summary value corresponding to a third value of the third node and at least one of the first value of the first node and the second value of the second node.

4. The system of claim 1, wherein the visiting sequence data structure further includes a second row vector enumerating one or more rows in the table corresponding to parent nodes in the first hierarchy or children nodes in the first hierarchy.

5. The system of claim 1, wherein the hierarchical window function is associated with a frame comprising one or more levels of the first hierarchy, wherein the summary value is determined based on the first value of the first node and the second value of the second node based at least on the first node and the first node occupying the one or more levels of the frame, and wherein the summary value is determined without a third value of a third node occupying a level outside of the frame.

6. The system of claim 5, wherein the visiting sequence data structure further includes a second row vector enumerating ancestor nodes of the first node occupying the one or more levels of the frame.

7. The system of claim 1, wherein the executing the hierarchical window function further includes iterating from a first row of the plurality of rows to a second row of the plurality of rows, wherein the first row corresponds to the first node of the first hierarchy and the second row corresponds to the second node in the first hierarchy, wherein the second node comprises a child node of the first node when the hierarchical window function is executed in a top down order, and wherein the second node comprises a parent node of the first node when the hierarchical window function is executed in a bottom up order.

8. The system of claim 1, wherein the first hierarchy comprises a rooted product or a join between a second hierarchy and a third hierarchy.

9. The system of claim 1, wherein the first hierarchy comprises a partition from a second hierarchy that is divided into the first hierarchy and a third hierarchy, wherein the executing of the hierarchical window function further includes generating another visiting sequence data structure including a second row vector specifying an order for traversing a plurality nodes comprising the third hierarchy and iterating through the plurality of nodes comprising the third hierarchy in the order specified by the second row vector.

10. The system of claim 1, wherein executing the hierarchical window function further comprises generating a second hierarchy that is a partition from the first hierarchy or a result of a rooted join between the first hierarchy and a third hierarchy.

11. The system of claim 1, wherein the representation of the first hierarchy is generated by at least applying an indexing scheme to the first hierarchy, and wherein the applying of the indexing scheme includes assigning, to each of the plurality of nodes comprising the first hierarchy, one or more labels to enable an identification of parent nodes, children nodes, and sibling nodes in the first hierarchy.

12. The system of claim 11, wherein the indexing scheme comprises a Pre, Post, Parent, and Level (PPPL) indexing scheme and/or a Pre, Size, and Level (PSL) indexing scheme.

13. A computer-implemented method, comprising:
generating, based at least on a representation of a first hierarchy stored in a database, a visiting sequence data structure for executing a hierarchical window function on the first hierarchy, the first hierarchy being stored in a table in the database with each node of the first hierarchy being stored in one of a plurality of rows comprising the table, the hierarchical window function iterating through the first hierarchy to determine, for each node of a plurality of nodes in the first hierarchy, a summary value corresponding to a first value of the node and a second value of one or more ascendant nodes or descendent nodes of the node, the first hierarchy including at least one node that is stored in non-consecutive rows of the table as an ascendant node or a descendant node of the at least one node such that traversing the first hierarchy in a bottom up order or a top down order requires traversing the plurality of rows of the table in a non-consecutive order as indicated by the visiting sequence data structure, the visiting sequence data structure including a first row vector enumerating the plurality of rows in an order in which the plurality of rows in the table are to be traversed during the executing of the hierarchical window function in order to traverse the plurality of nodes in the first hierarchy to include, with each successive iteration of the hierarchical window function, at least one ascendant node or descendent node of a node included in a previous iteration of the hierarchical window function; and
executing the hierarchical window function by at least iterating through the plurality of rows comprising the table, the plurality of rows being iterated in the order specified by the first row vector, and determining, a first value of a first node and a second value of a second node ascendant or descendent from the first node, a first summary value.

14. The method of claim 13, wherein the summary value comprises an average, a count, a maximum, a medium, a minimum, a mode, a range, and/or a sum of the first value of the first node and the second value of the second node.

15. The method of claim 13, wherein the execution of the hierarchical window function further comprises determining, for a third node ascendant or descendent from the first node and/or the second node, a second summary value corresponding to a third value of the third node and at least one of the first value of the first node and the second value of the second node.

16. The method of claim 13, wherein the visiting sequence data structure further includes a second row vector enumerating one or more rows in the table corresponding to parent nodes in the first hierarchy or children nodes in the first hierarchy.

17. The method of claim 13, wherein the hierarchical window function is associated with a frame comprising one or more levels of the first hierarchy, wherein the summary value is determined based on the first value of the first node and the second value of the second node based at least on the first node and the first node occupying the one or more levels of the frame, and wherein the summary value is determined without a third value of a third node occupying a level outside of the frame.

18. The method of claim 17, wherein the visiting sequence data structure further includes a second row vector enumerating ancestor nodes of the first node occupying the one or more levels of the frame.

19. The method of claim 13, wherein the executing the hierarchical window function further includes iterating from a first row of the plurality of rows to a second row of the plurality of rows, wherein the first row corresponds to the first node of the first hierarchy and the second row corresponds to the second node in the first hierarchy, wherein the second node comprises a child node of the first node when the hierarchical window function is executed in a top down order, and wherein the second node comprises a parent node of the first node when the hierarchical window function is executed in a bottom up order.

20. A non-transitory computer readable medium storing instructions, which when executed by at least one data processor, result in operations comprising:
generating, based at least on a representation of a first hierarchy stored in a database, a visiting sequence data structure for executing a hierarchical window function on the first hierarchy, the first hierarchy being stored in a table in the database with each node of the first hierarchy being stored in one of a plurality of rows comprising the table, the hierarchical window function iterating through the first hierarchy to determine, for each node of a plurality of nodes in the first hierarchy, a summary value corresponding to a first value of the node and a second value of one or more ascendant nodes or descendent nodes of the node, the first hierarchy including at least one node that is stored in non-consecutive rows of the table as an ascendant node or a descendant node of the at least one node such that traversing the first hierarchy in a bottom up order or a top down order requires traversing the plurality of rows of the table in a non-consecutive order as indicated by the visiting sequence data structure, the visiting sequence data structure including a first row vector enumerating the plurality of rows in an order in which the plurality of rows in the table are to be traversed during the executing of the hierarchical window function in order to traverse the plurality of nodes in the first hierarchy to include, with each successive iteration of the hierarchical window function, at least one ascendant node or descendent node of a node included in a previous iteration of the hierarchical window function; and executing the hierarchical window function by at least iterating through the plurality of rows comprising the table, the plurality of rows being iterated in the order specified by the first row vector, and determining, a first value of a first node and a second value of a second node ascendant or descendent from the first node, a first summary value.

\* \* \* \* \*